Dec. 27, 1960   T. P. DE PARAVICINI   2,966,047
COOLING OF CABINS AND OTHER COMPARTMENTS
Filed Feb. 7, 1958
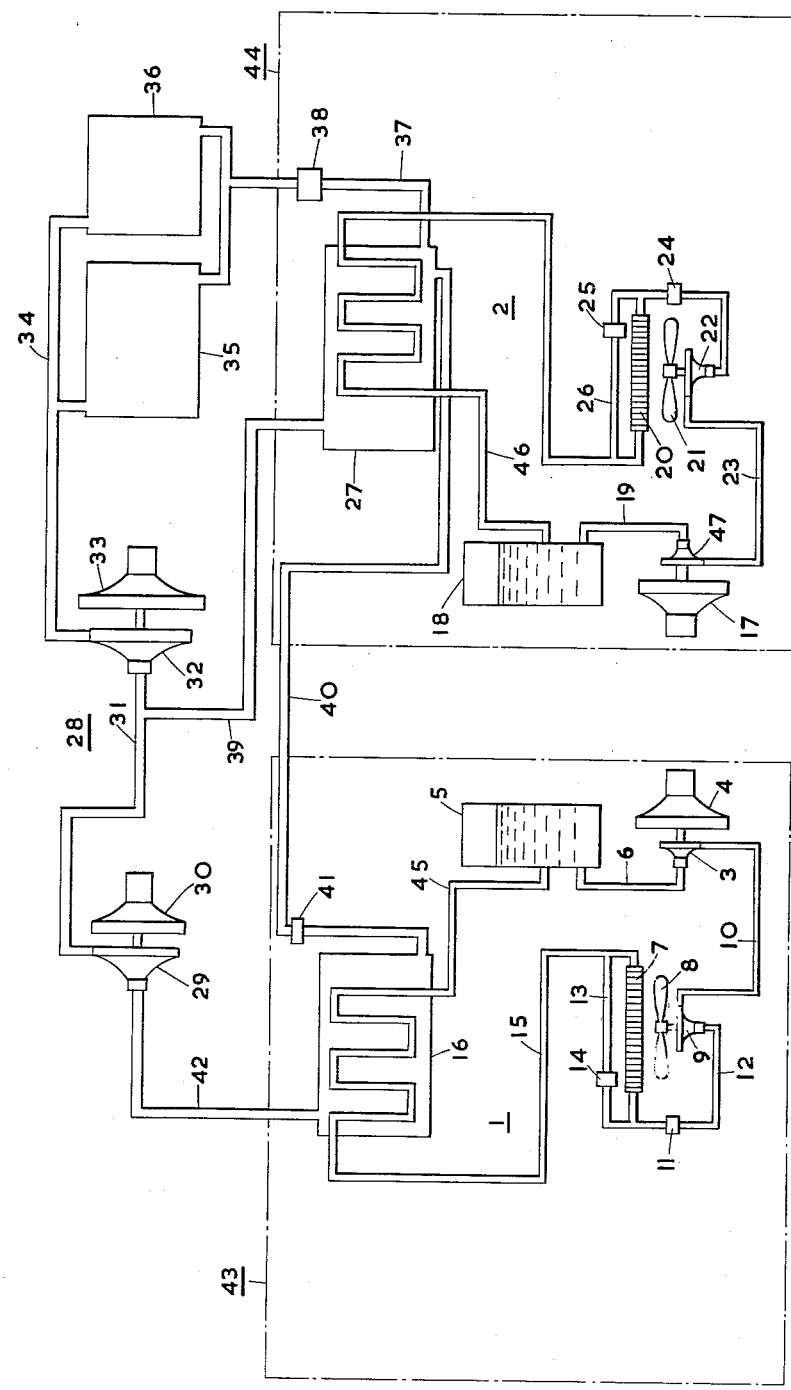

United States Patent Office 2,966,047
Patented Dec. 27, 1960

2,966,047

COOLING OF CABINS AND OTHER COMPARTMENTS

Thomas Pitt de Paravicini, West Hendford, Yeovil, England, assignor to Normalair Limited, Yeovil, England Filed Feb. 7, 1958, Ser. No. 713,967

Claims priority, application Great Britain Feb. 13, 1957

6 Claims. (Cl. 62—335)

This invention relates to the cooling of cabins and other compartments of aircraft and particularly though not exclusively to high speed reconnaissance aircraft.

One object of the present invention is to provide a system for cooling individual compartments in an aircraft particularly when such compartments require to be maintained at different temperatures.

Another object of the present invention is to provide a system for cooling individual compartments in an aircraft whereby a closed circuit vapour cycle system in heat transference relationship with heat absorbing liquid medium is used for the cooling of the aircraft compartments.

Another object of the present invention is to provide a system of cooling individual compartments of an aircraft according to the preceding paragraph wherein air to be cooled is caused to flow under influence of air moving means through air cooling means in heat exchange relationship therewith.

Another object of the present invention is to provide a system for cooling individual compartments of an aircraft according to the two preceding paragraphs wherein said air cooling means comprises an air to liquid cooler wherein air to be cooled is caused to flow by said air moving means through said cooler in heat exchange relationship with said heat absorbing liquid.

Another object of the present invention is to provide a system for cooling individual compartments of an aircraft according to the three preceding paragraphs wherein said air moving means comprises a fan connected and rotated by a fluid driven turbine said turbine caused to rotate by passage of said heat absorbing medium therethrough.

Another object of the present invention is to provide a system for cooling individual compartments of an aircraft according to the four preceding paragraphs wherein said closed circuit vapour cycle system includes a low and high pressure compressor in conduit communication with one or more condensers in parallel and has evaporators in cascade arrangement with one another and in heat transference relationship with a heat absorbing medium consisting of a solution of water and a liquid having in comparison a low freezing point.

Another object of the present invention is to provide a system of cooling individual compartments of an aircraft according to the preceding paragraph wherein at least one of said condensers in parallel is cooled by passage therethrough of engine fuel.

Another object of the present invention is to provide a system of cooling individual compartments of an aircraft according to the five preceding paragraphs wherein temperature diversion valves incorporated within the system allow heat absorbing liquid medium to flow through or by-pass said air cooling means.

Another object of the present invention is to provide a system of cooling individual compartments of an aircraft according to the six preceding paragraphs wherein pressure reducing means in the form of a reduced orifice is provided in the conduit of the system between said air cooling and air cooling means.

Other and further important objects of the invention will be readily understood from the following detailed description, claims and accompanying drawing which shows the air temperature control system in diagrammatic form.

The present invention briefly consists in a system for cooling individual compartments in an aircraft comprising a closed circuit vapour cycle system in cascade with a water/anti-freeze solution as heat transfer liquid, air supply to the vapour cycle system compressor turbines being tapped from main engines, two water circulating systems each operating at different temperatures, individual coolers in each compartment to be cooled, circulating fans directing the ambient air of each compartment through each respective cooler, hydraulic turbines, or other hydraulic prime movers, for driving said circulating fans and operated by pressure in said circulating systems and an air turbine driving a circulating pump for each hydraulic circuit.

In one arrangement, by way of example, embodying the present invention with reference to the accompanying drawing there is provided two water circulating cooling systems using a water/anti-freeze solution and hereinafter referred to as the low temperature system (say —10° C. water) generally indicated at 1 and the high temperature system (say +30° C. water) generally indicated at 2. Each water/anti-freeze solution circulating cooling system is identical, however, and in order to understand the system clearly the following description will refer to the low temperature system only.

Circulation of the water/anti-freeze solution hereinafter referred to as the solution around the circuit generally indicated at 1 is maintained by means of a centrifugal pump 3 driven by a turbine 4 in turn driven by air under pressure supplied from the aircraft's main engines. A turbine powered in this manner is known as an air turbine, the exhaust air from the turbine being discharged overboard or to any part of the aircraft as desired. The feed to pump 3 is supplied by header tank 5 by way of conduit 6 and maintained under suitable pressure to prevent cavitation taking place in the pump 3.

Located within the compartment to be cooled is a water to air cooler 7 through which the air in the compartment of the aircraft is caused to flow by means of a rotating fan 8 driven by a water turbine 9 fed by the high pressure discharge from the centrifugal pump 3 via conduit 10.

Since the power of the water turbine is limited the fan speed is permitted to vary as the density of the air passing through the cooler changes. As a result the fan speed may be high and produce a large volume flow when the air density is low but when the air density is high the fan speed may fall, yet produce a sufficient mass flow of air for the cooling requirements. This behaviour of the water turbine driven fan is advantageous compared to a fan driven at nearly constant speed by an electric motor.

Pressure reducing means 11 in this example takes the form of a reduced orifice interposed between the water turbine 9 and cooler 7 in order to prevent the cooler from being subjected to high water pressures in excess of the predetermined design limits.

The solution is discharged from water turbine 9 into conduit 12 and passes to cooler 7 via pressure reducing orifice 11. The solution can by-pass the cooler to a certain extent by means of conduit 13 controlled by a temperature diversion valve 14. The solution then flows by way of conduit 15 to an evaporator 16 and returning therefrom to pressurised header tank 5.

The high temperature circulating system generally indicated at 2 comprises identical components and functions in similar manner except for temperature difference to that of the low temperature circulating system. Thus the solution is circulated by means of a centrifugal pump 47 driven by an air turbine 17 and fed from a pressurised header tank 18 by way of conduit 19. Located within the compartment is a water to air cooler 20 through which the ambient air in the compartment of the aircraft is caused to flow by means of a rotating fan 21 driven by a water turbine 22 fed by the high pressure discharge from centrifugal pump 16 via conduit 23.

Pressure reducing orifice 24 is interposed between water turbine 22 and cooler 20 and said cooler can be by-passed by means of temperature diversion valve 25 and conduit 26. The solution after passing through cooler 20 then flows through evaporator 27 and returns to pressurised header tank 18.

A closed circuit vapour cycle system in cascade generally indicated at 28 comprises a low pressure refrigerant centrifugal compressor 29 driven by an air turbine 30 fed by air under pressure from the aircraft's main engines. This compressor is in conduit communication with a high pressure centrifugal compressor 32 by means of conduit 31. Air turbine 33 drives this compressor which is in communication by means of conduit 34 with fuel and water condensers 35 and 36 respectively. The condensers communicate with evaporator 27 by means of conduit 37. Between said condensers and evaporator is an expansion valve 38 of the known type. Evaporator 27 communicates with the inlet side of high pressure compressor via conduit 39 and also with evaporator 16 via conduit 40 which houses an expansion valve 41 therebetween. Conduit 42 completes the vapour cycle circuit communicating evaporator 16 to the inlet of low pressure compressor 29.

Having thus described the solution circulation system and its associated closed circuit vapour cycle system, the combined system as a whole in operation is as follows. In an aircraft having compartments requiring differing degrees of cooling or temperature control, there is shown, by way of example only, one compartment generally indicated at 43 and represented by the area enclosed by chain dotted outline and another compartment generally indicated at 44, and represented by the area enclosed by chain dotted outline. Compartment 43 is required to be maintained at a lower temperature than that of compartment 44.

Referring to the cooling system as illustrated in compartment 43, solution contained in pressurised header tank 5 is pumped to water turbine 9, by means of centrifugal pump 3 by way of conduits 6 and 10. The solution passes through water turbine 9, in so doing rotating fan 8, and passes by way of conduit 12 and pressure reducing orifice 11 to air cooler 7.

Air within compartment 43 is caused to move through cooler 7 under action of rotating fan 8 whereby the temperature of the air is reduced and in turn the temperature of the solution passing through the cooler is increased. Should the temperature within the compartment exceed a predetermined limit, diversion valve 14 if in the open position will close and ensure that all the solution is passed through cooler 7. Inversely, if the temperature of the compartment falls below a predetermined limit, diversion valve 14, if in the closed position, will open and allow the cooler 7 to be by-passed to such an extent that a rise in temperature will be obtained.

The solution then passes by way of conduit 15 through evaporator 16 where the heat absorbed by the solution is imparted to the refrigerant present in the evaporator, the solution then returning by way of conduit 45 to header tank 5. The circulation of the cooling solution in compartment 44 is carried out in an identical manner to that in compartment 43 by way of conduits and components already referred to.

The cooling of the solution in the two circuits indicated by 1 and 2 is effected in each case by passing the solution through evaporators of the vapour cycle system indicated at 28. This system, having evaporators 16 and 27 is cascade communication with each other, operates in the following manner. Solution circulating in the cooling circuit 1, having absorbed heat from the air passing through cooler 7, passes through evaporator 16 in turn giving up its heat to the refrigerant within evaporator 16. The refrigerant then passes by way of conduit 42 to low pressure centrifugal compressor 29 from whence it flows to the inlet of high pressure centrifugal compressor 32 and mixes with the main gas stream carried by conduit 39 from the high temperature evaporator 27. The whole of the refrigerant gas is then compressed and passes to two condensers in parallel. Condenser 35 is cooled by means of the aircraft's engine fuel passing therethrough and condenser 36 is cooled by water. Condenser 36 is only operative during overload or emergency conditions and is governed by a steam outlet valve (not shown) controlled at a predetermined temperature, thus at condensing temperatures below the predetermined temperature the whole of the heat absorbed from the refrigerant is rejected to the engine fuel.

Liquid refrigerant from the condensers pass through expansion valve 38 into evaporator 27 in the compartment indicated at 44. The temperature of this compartment is not required to be maintained as low as that of compartment 43 and heat absorbed from solution in cooling circuit 2 passing through evaporator 27 is transferred to the refrigerant, which in turn flows to the inlet side of compressor 32 by way of conduit 39. Some of the refrigerant on entering evaporator 27 passes direct to evaporator 16 by way of conduit 40 and expansion valve 41. This refrigerant is at a lower temperature than that leaving evaporator 27 by way of conduit 39 and therefore enables the temperature of compartment 43 to be maintained lower than that of compartment 44.

Although the foregoing has referred to the cooling of two compartments at differing temperatures in an aircraft, it will be apparent to those skilled in the art that modifications to the systems so disclosed to enable cooling of more than two compartments can be easily carried out without departing from the scope of the invention.

I claim as my invention:

1. In an aircraft compartment temperature control system, in combination, a closed circuit vapour cycle system having heat exchange means in cascade communication with each other, a closed circuit circulating system including in part air cooling means and air moving means, heat absorbing liquid medium circulating within said circulating system and in communication with the heat exchange means of said vapour cycle system, said heat absorbing liquid medium operating said air moving means by its passage therethrough.

2. In an aircraft compartment temperature control system, in combination, a closed circuit vapour cycle system having heat exchange means in cascade communication with each other, a closed circuit circulating system including in part air cooling means comprising an air to liquid cooler and air moving means, heat absorbing liquid medium circulating within said system and in communication with said heat exchange means of said vapour cycle system, said heat absorbing liquid medium operating said air moving means by its passage therethrough.

3. In an aircraft compartment temperature control system, in combination, a closed circuit vapour cycle system having heat exchange means in cascade communication with each other, a closed circuit circulating system including in part air cooling means and air moving means comprising a fan connected to and rotated by a fluid driven turbine, heat absorbing liquid medium circulating within said circulating system and in communication with the heat exchange means of said vapour cycle system, said heat absorbing liquid medium operating said air moving means by its passage therethrough.

4. In an aircraft compartment temperature control system according to claim 3 wherein said heat absorbing liquid medium consists of a solution of water and a liquid having in comparison a low freezing point.

5. In an aircraft compartment temperature control system, in combination, a closed circuit vapour cycle system including low pressure and high pressure vapour compressing means in conduit communication, condensers in parallel and evaporators in cascade communication with each other, a closed circuit circulating system including in part air cooling means and air moving means, heat absorbing liquid medium circulating within said circulating system and in communication with heat exchange means of said vapour cycle system, said heat absorbing liquid medium operating said air moving means by its passage therethrough.

6. In an aircraft compartment temperature control system according to claim 5 wherein at least one of said condensers in parallel is cooled by the passage therethrough of engine fuel.

References Cited in the file of this patent

UNITED STATES PATENTS

| | | |
|---|---|---|
| 2,394,109 | Sanchez | Feb. 5, 1946 |
| 2,680,956 | Haas | June 15, 1954 |
| 2,720,083 | Garland | Oct. 11, 1955 |
| 2,797,068 | McFarlan | June 25, 1957 |